(12) United States Patent
Kroecker

(10) Patent No.: US 7,436,324 B2
(45) Date of Patent: Oct. 14, 2008

(54) MARITIME PORT INSPECTION AND INGRESS CONTROL

(76) Inventor: Stephan V. Kroecker, 3747 S. Ridge Cir., Titusville, FL (US) 32796

( * ) Notice: Subject to any disclaimer, the term of this patent is extended or adjusted under 35 U.S.C. 154(b) by 638 days.

(21) Appl. No.: 11/106,372

(22) Filed: Apr. 14, 2005

(65) Prior Publication Data
US 2007/0216541 A1     Sep. 20, 2007

Related U.S. Application Data

(60) Provisional application No. 60/563,081, filed on Apr. 16, 2004.

(51) Int. Cl.
*G08B 23/00* (2006.01)
(52) U.S. Cl. .................. 340/984; 340/993; 340/450; 340/856.4; 340/850; 340/600; 378/4; 378/57; 702/1
(58) Field of Classification Search ............... 340/984, 340/993, 994, 450, 463, 488, 851, 850, 853.2, 340/854.5, 856.4
See application file for complete search history.

(56) References Cited

U.S. PATENT DOCUMENTS

| | | | | |
|---|---|---|---|---|
| 3,793,974 A * | 2/1974 | Bylo | ............................ | 114/72 |
| 5,051,744 A * | 9/1991 | Ewart | .......................... | 340/984 |
| 6,394,015 B1 * | 5/2002 | Gabriel | ........................ | 114/151 |
| 6,473,004 B1 * | 10/2002 | Smull | .......................... | 340/984 |
| 6,550,408 B1 * | 4/2003 | Janssen | ........................ | 114/121 |
| 6,609,474 B1 * | 8/2003 | Robinson | .................... | 114/72 |
| 6,973,385 B2 * | 12/2005 | Ulrich | ........................ | 701/207 |
| 7,189,028 B1 * | 3/2007 | Signaroldi et al. | .......... | 405/166 |

* cited by examiner

*Primary Examiner*—Benjamin C. Lee
*Assistant Examiner*—Daniel Previl

(57) ABSTRACT

A marine port monitoring system including an inspection apparatus, either fixed or mobile, for intercepting cargo vessels entering the port. The system includes sensors placed in a shipping channel for examination of a hull of a passing vessel to detect externally mounted weapons or explosives. The inspection apparatus includes devices for removing cargo containers from vessels, non-intrusively inspecting the containers and isolating containers having suspect cargo. The apparatus includes explosive containment including a separable containment system for protecting the apparatus.

5 Claims, 17 Drawing Sheets

MARITIME PORT INSPECTION AND INGRESS CONTROL

SPECIFIC DATE RELATED TO THE INVENTION

This application claims the benefit of U.S. Provisional Application No. 60/563,081 filed Apr. 16, 2004.

BACKGROUND OF THE INVENTION

The present invention relates to homeland security and, more particularly, to a method and apparatus for protecting marine ports from clandestine attacks utilizing weapons hidden on incoming maritime vessels.

It is recognized that terrorist activities could be directed to marine ports for the purposes of disabling marine transportation of goods. In order to provide such protection, there needs to be provided some structure that has the assets to conduct surveillance, be capable of defending itself and be able to escort military and commercial vessels into an associated port. The present invention is directed to a structure that provides these capabilities.

The present invention contemplates one or more structures that would be placed just outside an entrance to a port on other marine access route for the purposes of monitoring and inspecting incoming maritime traffic. In an exemplary embodiment, for example, a pair of structures could be located on opposite sides of a shipping channel entering into the port or other waterway with sensors positioned laterally across the waterway so that the sensors could monitor traffic passing in the waterway from each of the structures. The sensors could include video and electromagnetic sensors positioned for the purposes of examining the hulls of vessels passing between the structures so as to be able to detect externally mounted devices that may be used to damage the port or waterway to prevent its use. Each structure would also include sufficient crews and equipment to enable a rapid inspection of any suspect vessels and sufficient weaponry to assure compliance with any orders to stop such vessels.

DETAILED DESCRIPTION OF THE INVENTION

Figure 1:
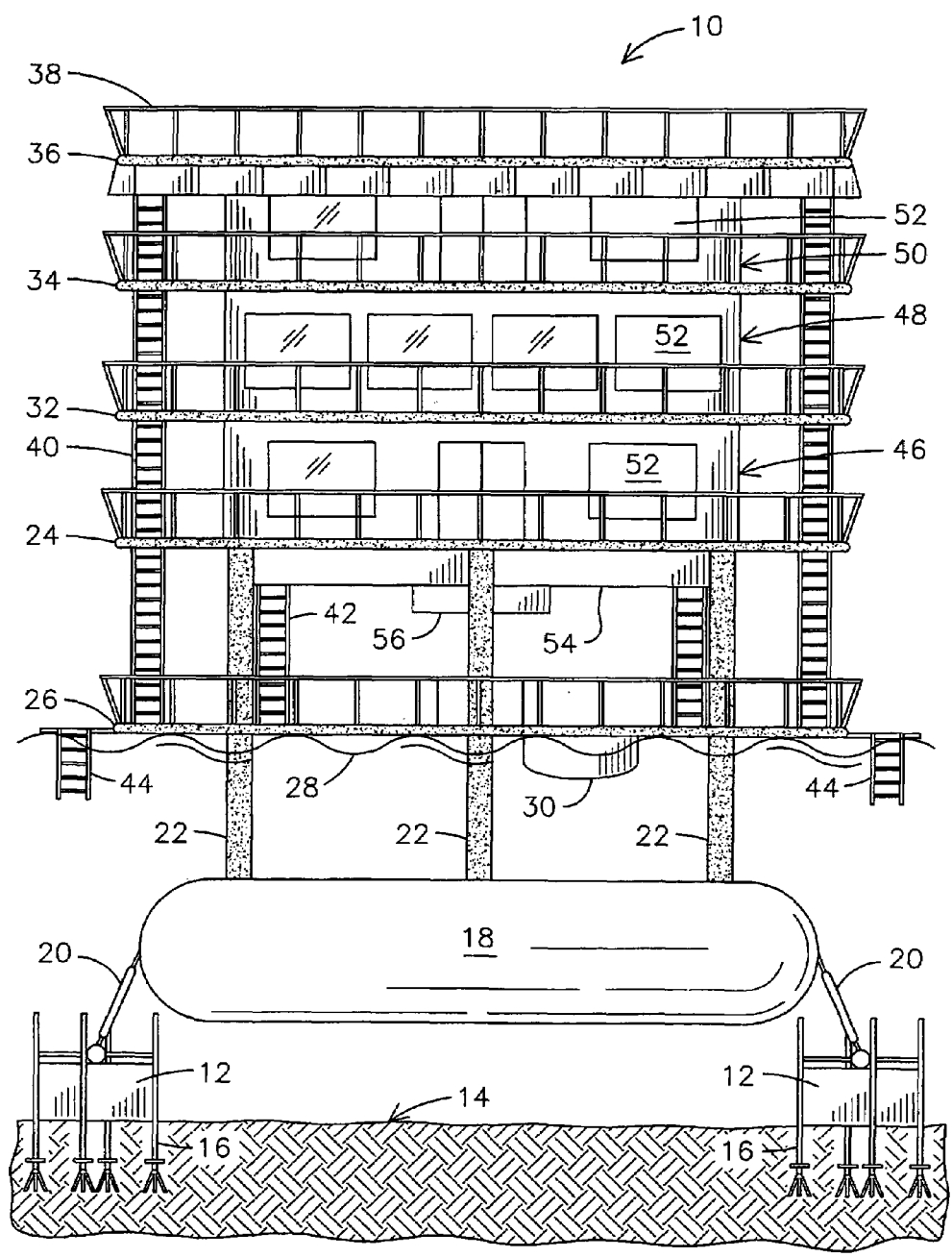
FIG. 1 illustrates one exemplary form of a structure in accordance with the present invention.

Turning now to FIG. 1, there is shown one example of an embodiment of a structure that may be used to implement the functions described above. In the embodiment of FIG. 1, the structure has some similarity to a conventional off-shore oil well drilling platform in that there is a significant underwater component used as ballast and a multi-level structural portion above the water surface. In the example of FIG. 1, the structure is held in position by two or more anchors 12 which are anchored to the sea bed indicated generally at 14 by means of power driven augers 16. The anchors 12 serve to hold the structure indicated generally at 10 in position to prevent drifting away from a desired anchor point. The structure 10 includes a pontoon ballast system 18. The pontoon ballast system 18 is coupled to the anchors 12 by means of cable anchors and current damping systems 20. Each of the damping systems 20 includes a damping function for compensating for ocean currents and swells that tend to cause motion or movement of the structure 10.

The upper part of the structure 10 is supported on the ballast system 18 by means of a plurality of columns 22. In an exemplary embodiment, the columns 22 are arranged at four corners of a rectangle with a center column at the midpoint so that there is a total of five vertical columns. However, the center column may not extend fully through all levels of the structure in order to provide, as will be seen in later cross-sectional views, more open space within the various levels. As shown in FIG. 1, the columns 22 extend at least from the ballast system 18 up to a primary level 24. The level 24 is fixed to the columns 22 and therefore maintains a fixed distance between that level and ballast system 18. Below primary level 24 is a floating level 26 whose vertical position with respect to ballast system 18 can be adjusted so as to maintain level 26 at about the nominal height of the ocean's swells indicated by 28. This adjustable height level 26 would typically be used as a storage area and a floatable landing dock for unloading supplies for the structure. By having the level 26 adjustable, any marine vessel such as personal watercraft or pontoon-type boats could be allowed to dock at the level and be brought onto the level for storage without the necessity of having onboard davits for raising the craft out of the water. Additionally, there may be provided a small boat ramp 30 to facilitate the movement of the smaller marine craft onto the level 26.

Above the primary level 24 there are three additional levels shown in this exemplary embodiment. The additional levels include levels 32, 34 and 36. The top most level 36 may provide a landing surface for helicopters and a support surface for weaponry to be mounted on the structure. A guardrail 38 extends around the level 36. Each of the levels 24, 26, 32, 34 and 36 are accessible by means of external ladders 40 and some internal ladders 42. Lower level ladders 42 attached to deck 26 also provide access from the sea onto the lower deck 26 for persons entering from the water or smaller marine vessels that may be docking at the level 26.

Figure 2:
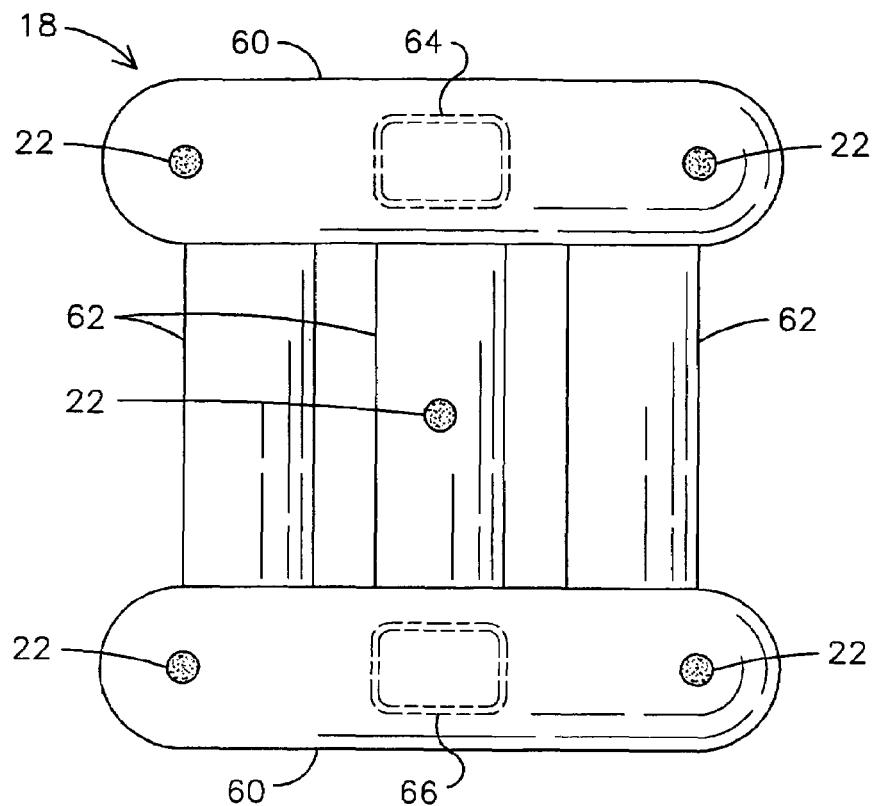
FIG. 2 is a top plan view of a pontoon ballast system used in the structure of FIG. 1.

The levels 24, 32 and 34 each include closed cabin structures formed into facilities for an onboard crew and for housing the main electronic equipment utilized for monitoring of vessels entering into an adjacent harbor or marine passageway. As illustrated in the view of FIG. 1, each of these sections are typical structural cabins 46, 48, and 50 each having large viewing windows 52 to enable observation of vessels passing near the structure. Each of the decks 24, 26, 32, 34 and 36 are structured with the guardrails 38 to minimize the likelihood of persons falling off the deck. In addition, various storage compartments are located below the primary deck 24 as indicated by utilities compartments 54. In addition, a retractable floating boat dock and ramp may be attached underside of deck 24 so that it is deployable to assist in loading supplies or personnel onto the structure 10. Still further, it is contemplated that additional storage space may be located within the pontoon ballast system 18 as will be described hereinafter. Turning now to FIG. 2, there is shown a top plan view of the pontoon ballast system 18. The ballast system comprises a pair of tanks 60 coupled together by a plurality of cross connection tanks 62. The columns 22 are shown mounted onto the tanks 60 and 62. Water storage tanks 64 and 66 may be mounted within the outer pontoon tanks 60. In one form, the water storage tank 64 may be designed for fresh water storage while the water tank 66 may be designed for brackish water storage simply for buoyancy.

Figure 3:
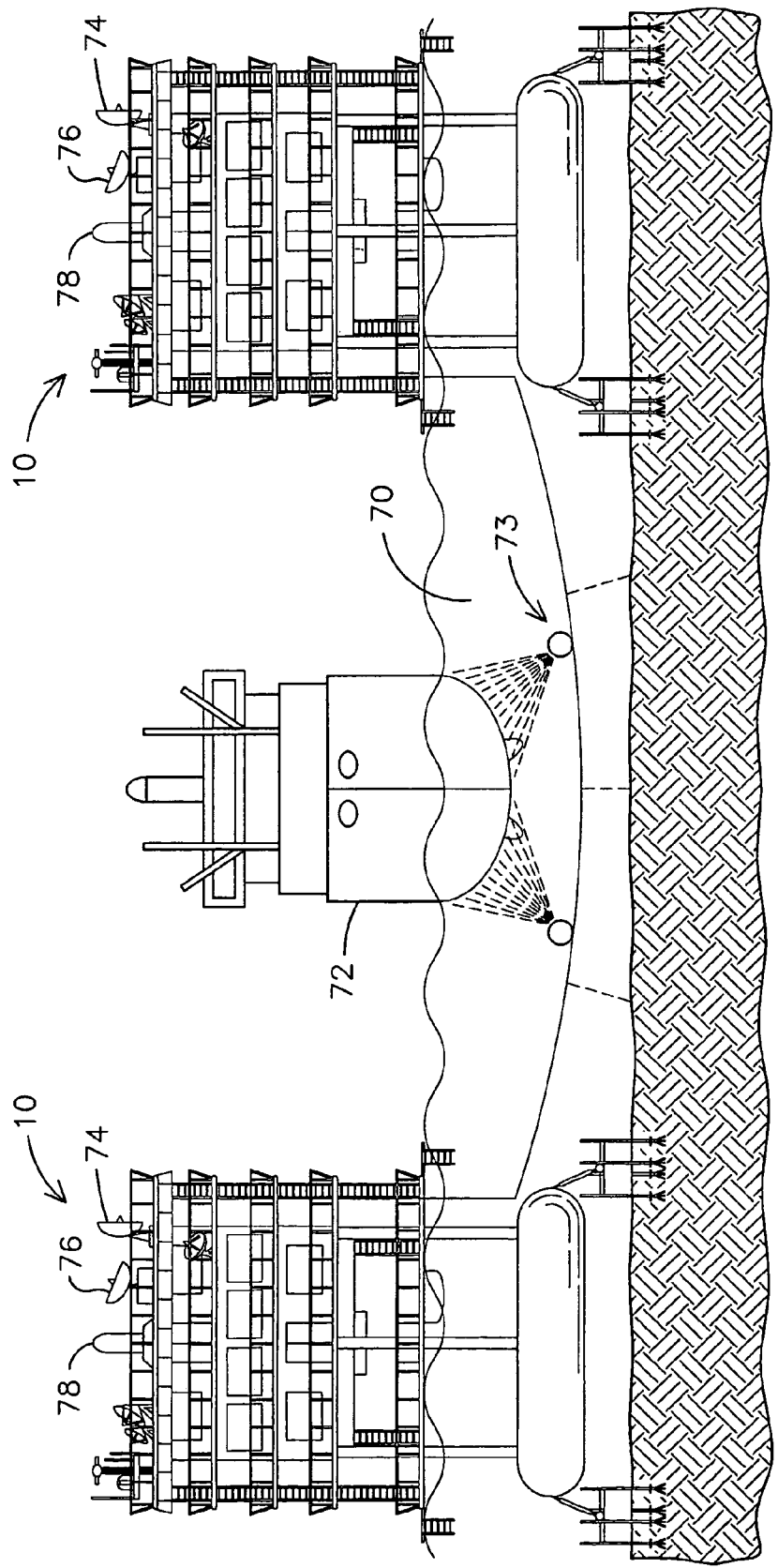
FIG. 3 is one embodiment of an arrangement of a pair of the structures of FIG. 1 used to guard a shipping channel.

Turning now to FIG. 3, there is shown one conception of a pair of the structures 10 utilized to guard a shipping channel. As is shown, the structures are placed on opposite sides of a channel 70 so that when a vessel such as vessel 72 passes into the channel, the vessel can be monitored from the structures and from underneath using hull detection including video recording and lighting system 73. The hull detection may comprise communication devices placed on the bottom of the channel and connected to each of the structures 10 for receiving data showing the hidden portions of the hull of the vessel 72. The video recording devices may comprise commercially available devices including low light level video sensors or cameras. Each of the structures 10 includes other surveillance systems including radar as indicated by antennas 74 mounted on the structures. The structures preferably also include satellite communication equipment and may include weaponry such as indicated by block 78.

Figure 4:
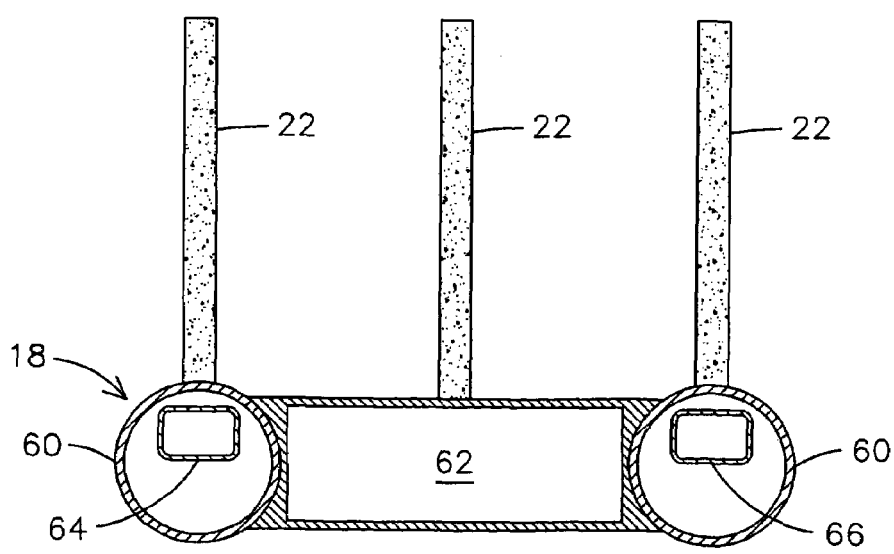
FIG. 4 is a cross-sectional view of the buoyancy system of FIG. 1.
Figure 5:
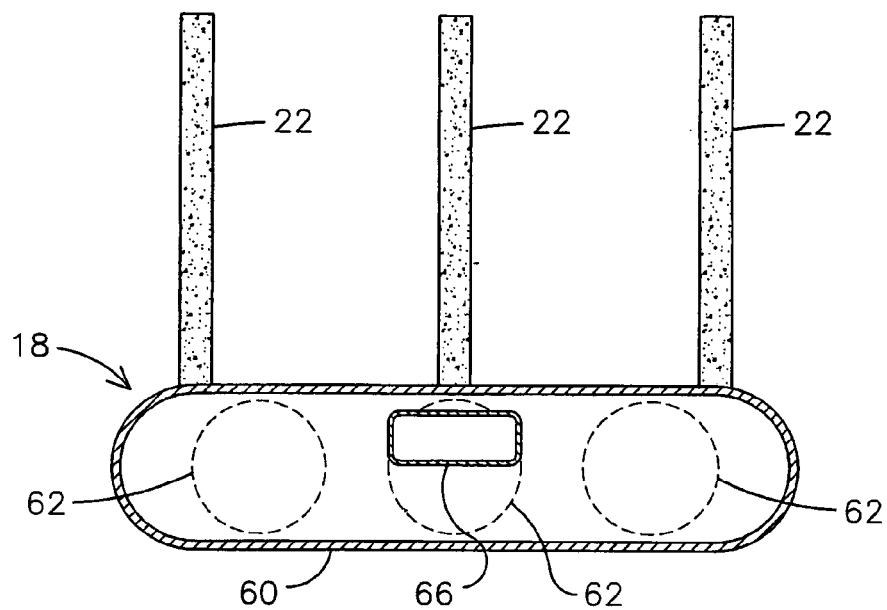
FIG. 5 illustrates a configuration of connecting tanks for the buoyancy tanks of FIG. 4.
Figure 6:
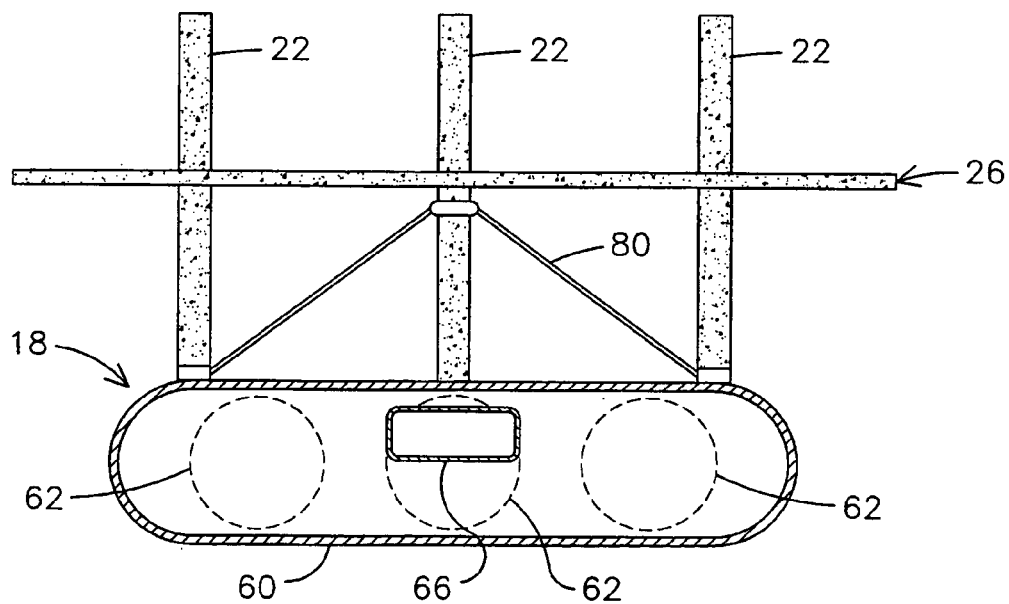
FIG. 6 illustrates a variable height floor arrangement for the buoyancy tanks of FIG. 5.
Figure 7:
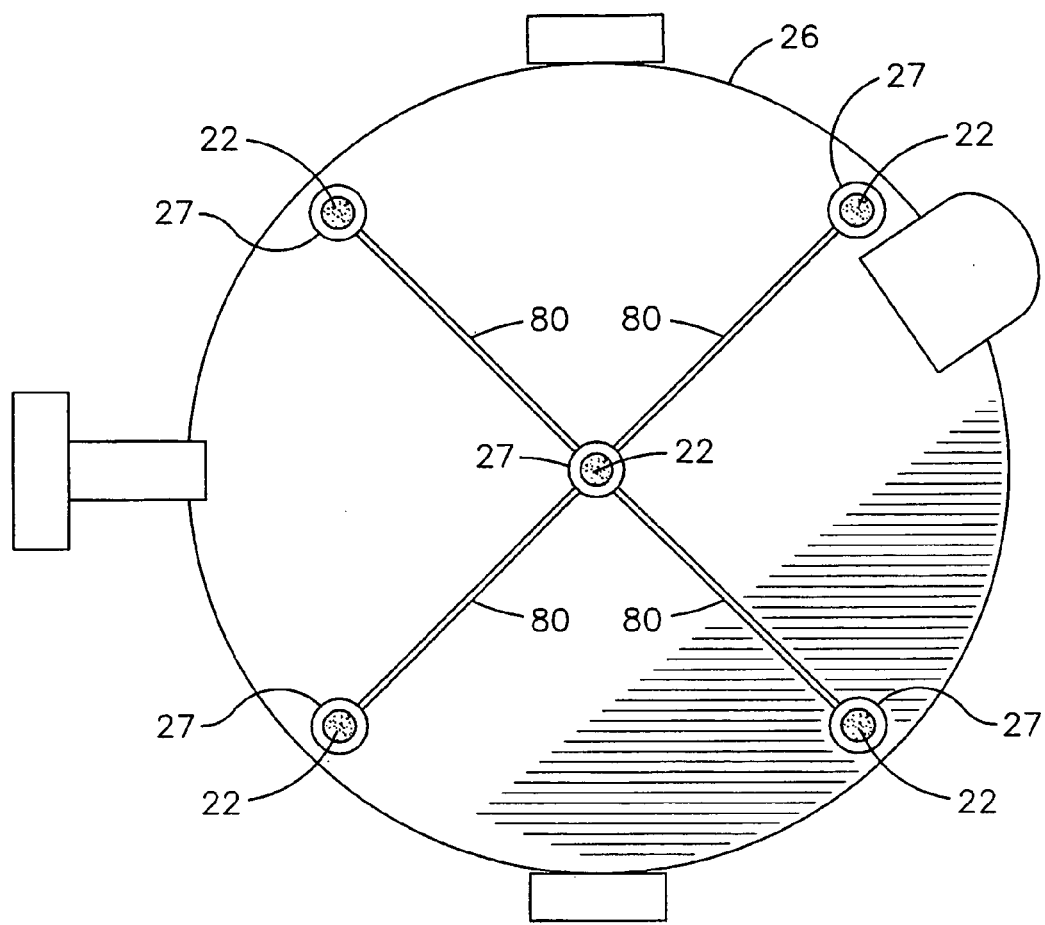
FIG. 7 illustrates one form of cabling connection system supporting the columns and support mechanism for the buoyancy system of FIG. 4.

Turning now to FIG. 4, there is shown a cross-sectional view of the buoyancy system 18 taken transverse to the view of FIG. 1. As shown in this figure, the buoyancy tank 60 is essentially circular in cross-sectional configuration. As will be seen in FIG. 5, the connecting tanks 62 may also have a circular configuration. Each of the connecting tanks 62 are fitted with watertight doors at each end that allow access into the buoyancy tanks 60. Each of the tanks 60 and 62 have access doors that allow access into the tanks. FIG. 6 is similar to FIG. 5 but also illustrates the variable height floor 26 and a portion of the adjusting cable connections which allow vertical movement of the floor 26 with respect to the buoyancy system 18. Considering FIG. 6 in conjunction with FIG. 7, it can be seen that the floor cabling connecting system indicated at 80 comprises tension wires extending from the base of each of the outer columns 22 to a support mechanism on center column 22. It should be noted that the deck 26 as well as all other decks of the system are preferably constructed in a circular configuration rather than rectangular. The deck 26 has openings for passing 27 each of the columns 22 so that the deck can be moved vertically with respect to the columns.

Figure 8:
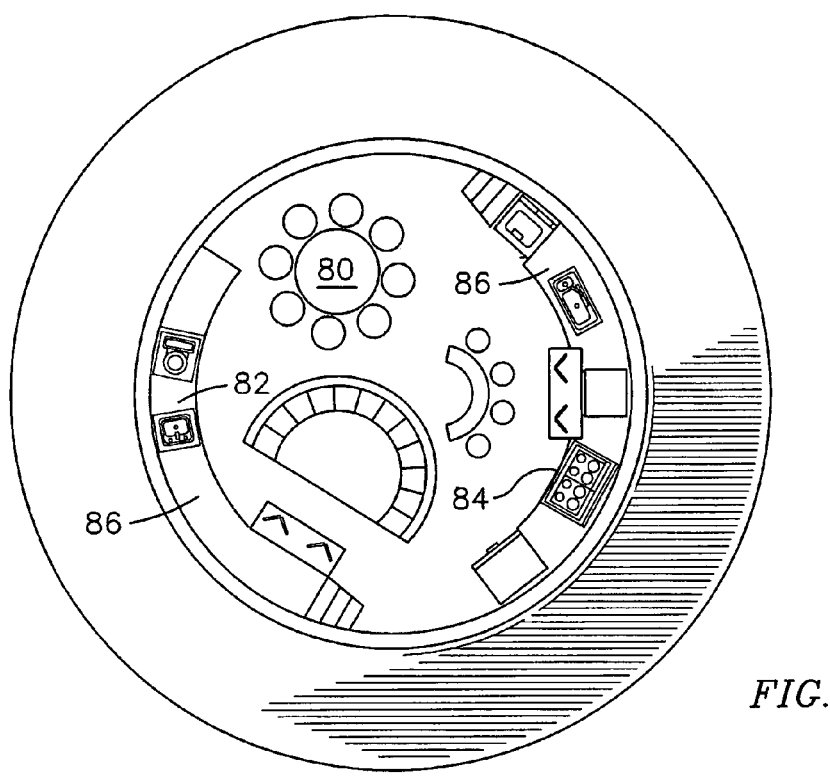
FIGS. 8, 9, 10 and 11 illustrate various different layout configurations for the decks of the structure of FIG. 1.
Figure 9:
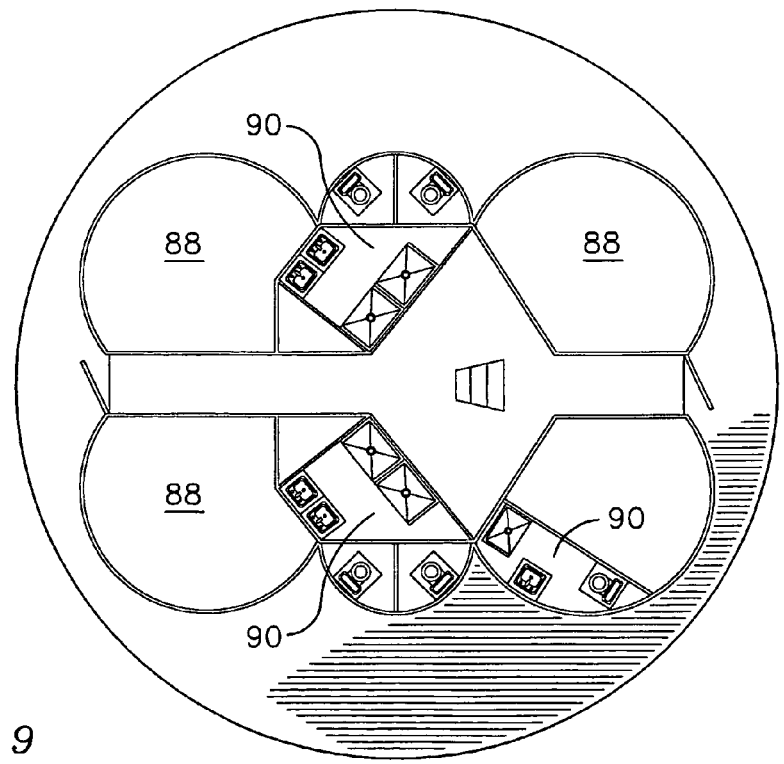
Figure 10:
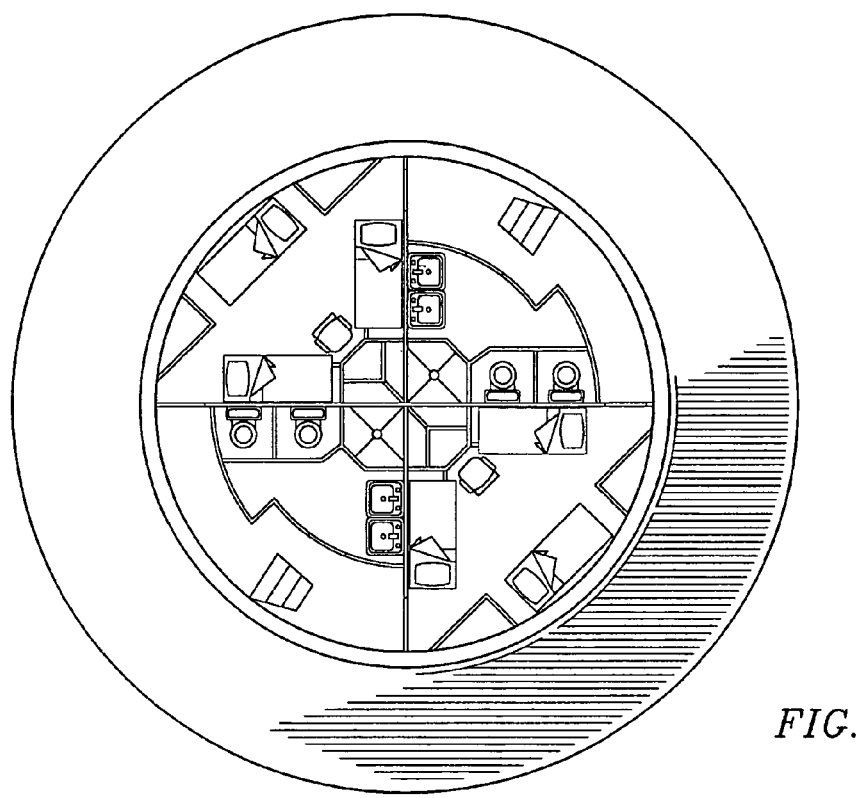
Figure 11:
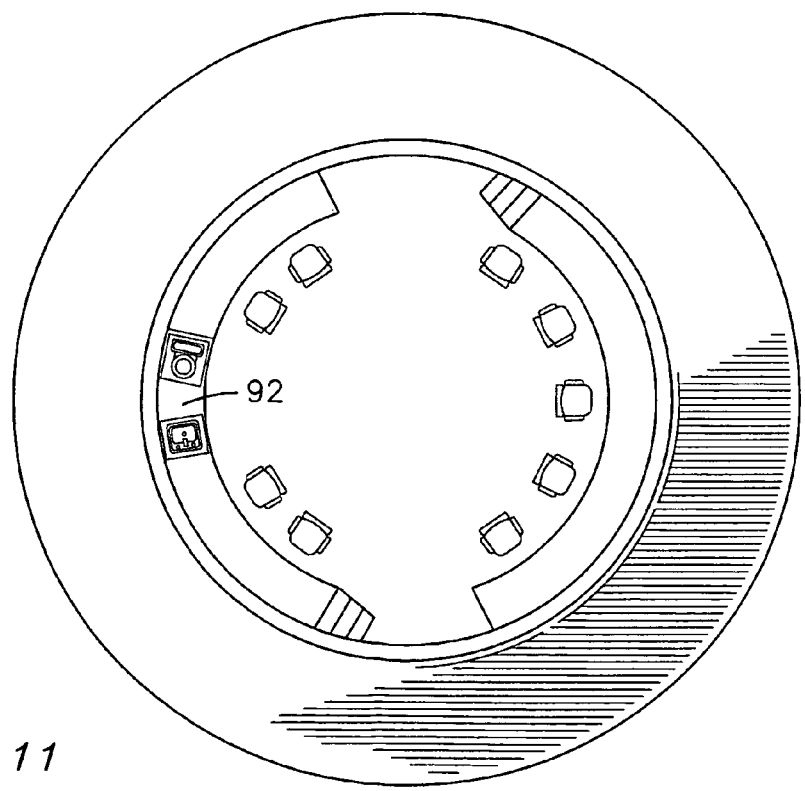

FIGS. 8, 9, 10, and 11 illustrate various layout configurations for decks such as decks 24, 32 and 34 of the structure 10. FIG. 8 illustrates one example of a living area that could be used for a crew stationed on the structure 10. The living area could include a table and chairs indicated generally at 81, a restroom indicated at 82, a cooking area indicated at 84, and elevated sleeping areas indicated at 86. FIG. 9 indicates an arrangement that may be used for sleeping quarters indicated generally at 88 and with associated bathrooms indicated at 90. FIG. 10 illustrates an alternative arrangement for sleeping areas in which the area is defined by a large circular cabin divided up into four quadrants, each quadrant being substantially identical and including a sleeping area and restroom facilities. FIG. 11 shows one form of work area in which the various consoles providing displays and indicators for external surveillance are positioned in a pair of arcs about the walls of the circular cabin with the crew's chairs positioned to face the various consoles. The work area may also include a restroom as indicated at 92.

Figure 12A:
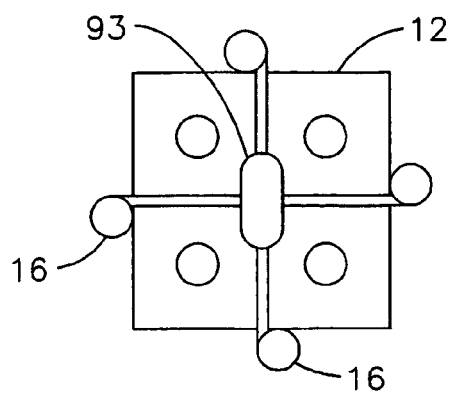
FIGS. 12A-12F illustrate the anchors and associated augers for maintaining the structure of FIG. 1 in a fixed location.
Figure 12B:
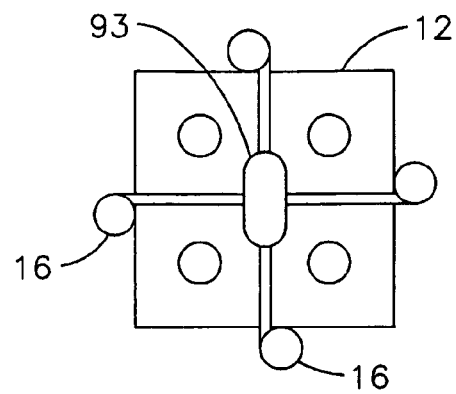
Figure 12C:
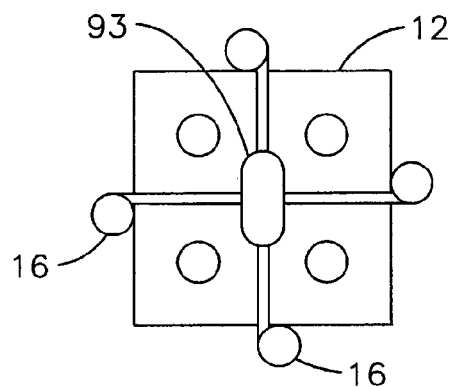
Figure 12D:
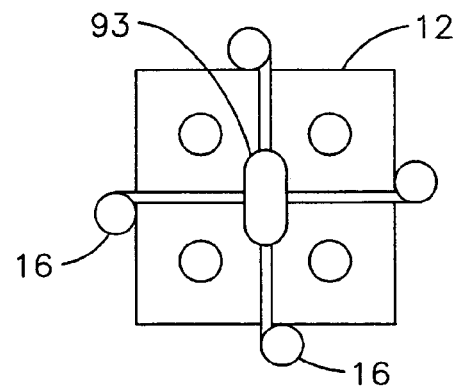
Figure 12E:
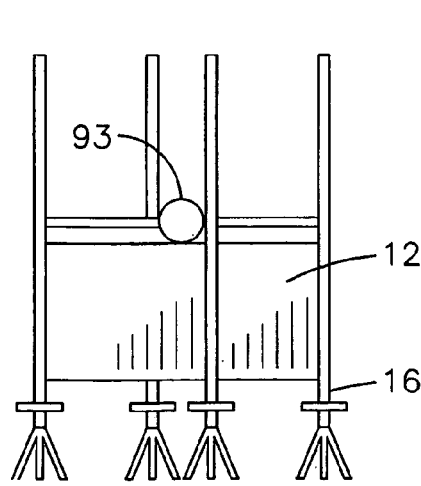
Figure 12F:
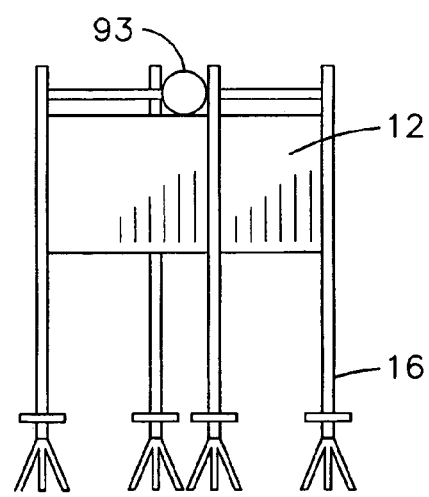

Turning now to FIGS. 12A-12F, there are shown each of the individual anchors 12 with their associated augers 16. Referring particularly to FIG. 12A, it may be seen that the anchors are substantially rectangular in shape with four augers extending from opposite sides of each anchor. On top of the anchor there is provided an auger motor and worm gear assembly 93 that is coupled to each of the anchors 16 to enable the anchors to be rotated so as to be driven into the underlying bottom material of the port or channel. FIG. 12E illustrates the initial position of the anchor 12 with the augers and their raised or pre-anchoring positions. In FIG. 12F, the anchors have been driven downward so as to fully anchor the anchor 12 to the underlying surface of the port or channel. Various motors and gear drive arrangements are available to concurrently drive multiple devices such as this and the particular arrangement of such devices is not considered to be within the scope of the present invention. What is unique to the present invention is the general concept of utilizing a device such as 12 which can be anchored by remotely actuating an auger motor and worm gear assembly to drive the associated auger 16 downward to thereby firmly anchor the device 12 to an underlying substance.

Figure 13:
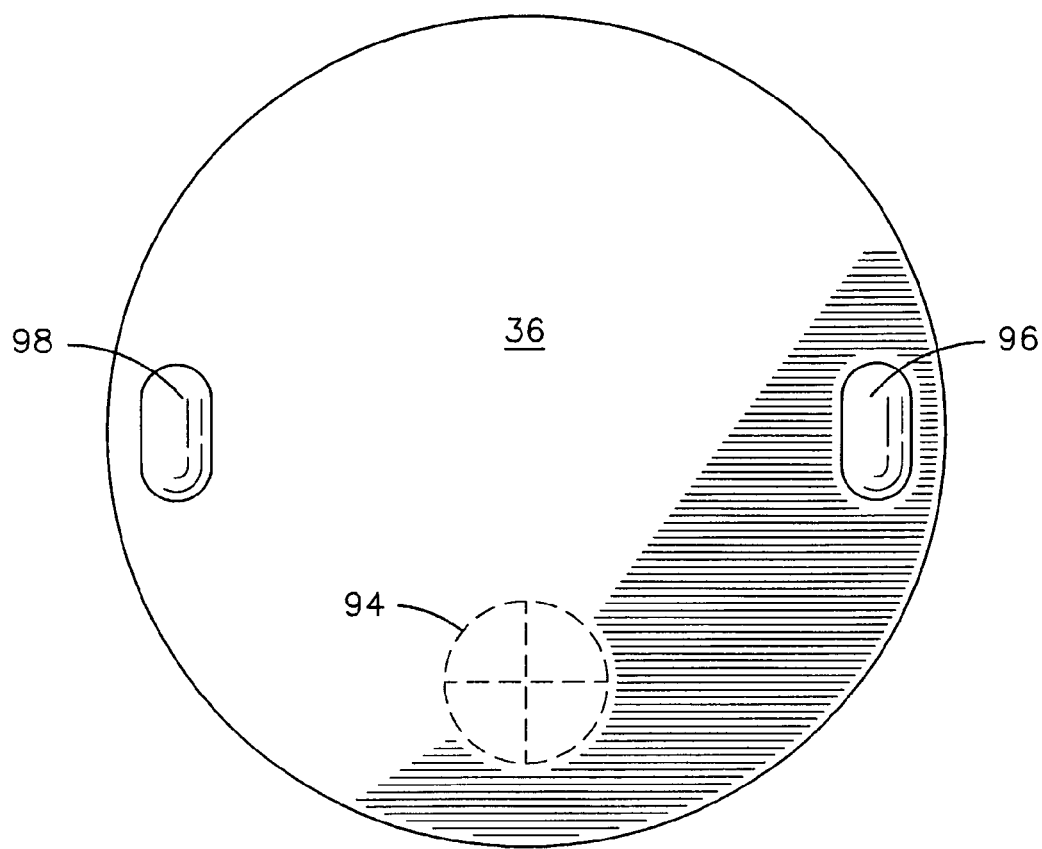
FIG. 13 is a top plan view and FIG. 13A is an elevation view of one embodiment of the top level of the structure of FIG. 1.
Figure 13A:
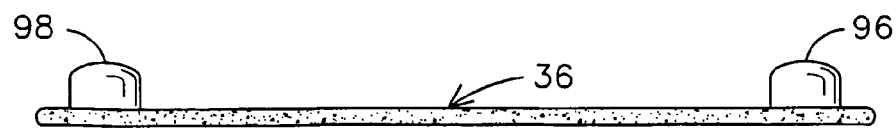

FIG. 13 is a top plan view and FIG. 13A is an elevation view of one embodiment of the top level 36 of the structure 10. In this embodiment, the level 36 includes a helicopter pad 94, a watertight radar or satellite locker 96 and a water tank communications locker 98. As described previously, level 26 may also include a mounting platform for appropriate weaponry to be maintained on the structure 10 such as the phalanx weapon system. FIG. 13A merely shows that the watertight cabinets extend upward above a surface of the level 36.

Figure 14:
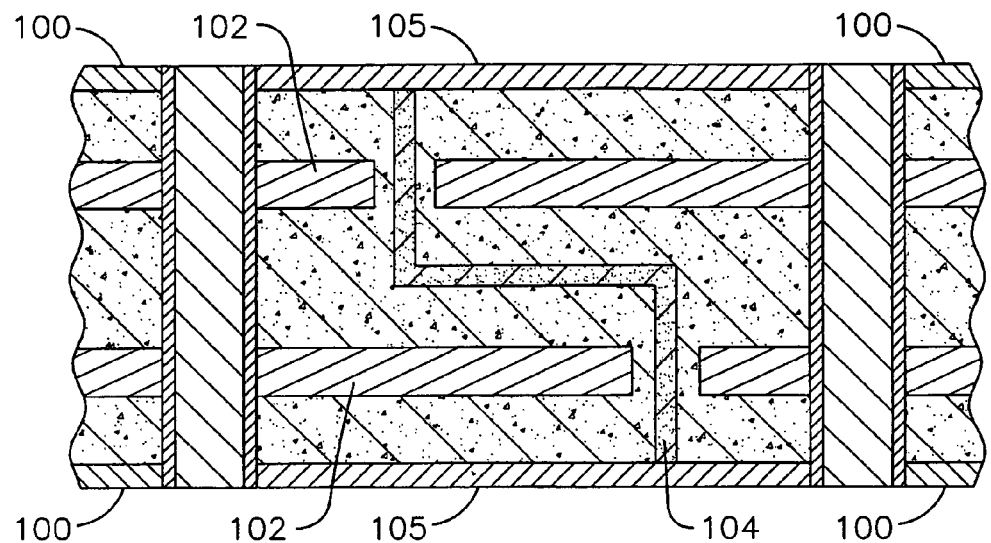
FIG. 14 illustrates a joining process for deck sections for the structure of FIG. 1.
Figure 15:
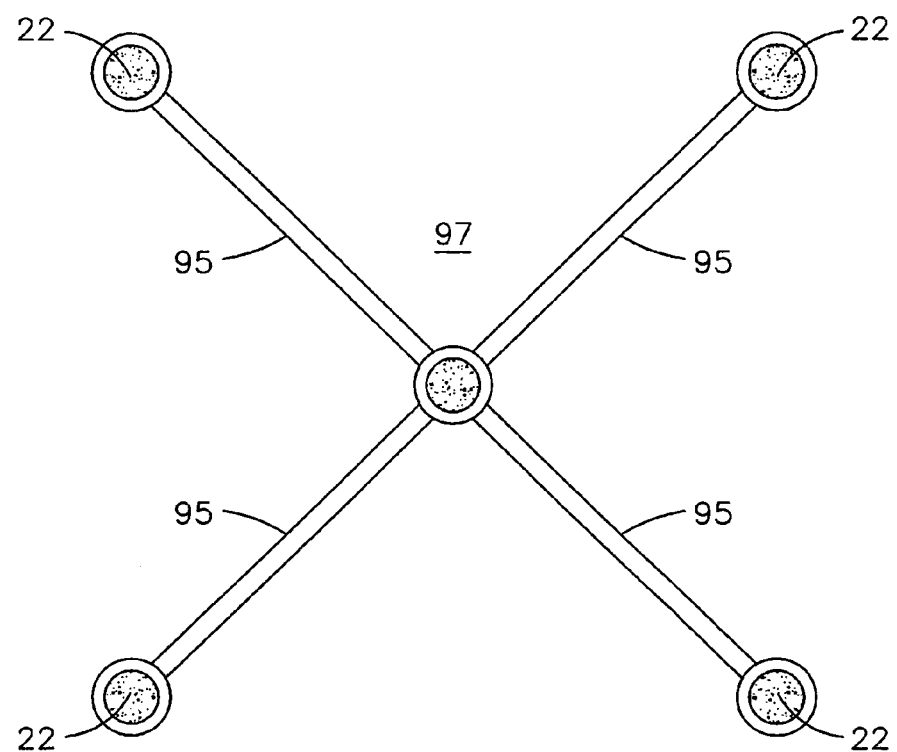
FIG. 15 illustrates formation of the deck sections of FIG. 14 in equal 90 degree segments.

Considering now FIGS. 14 and 15, one of the concepts of the present invention is to create each of the decks 26, 32, 34 and 36 in pie-shaped sections. Each of the pie-shaped sections could be lifted and fitted together in order to create a completely round, circular deck. The advantage of this structure is that individual quadrants can be constructed on shore and then lifted into place so as to build the structure in situ. Accordingly, the initial structure 10 is built in a framework having an X-shaped configuration extending from the outer columns through the center column. The individual floors forming each of the quadrants can be then be fitted into the pie-shaped areas defined between the cross pieces 95 of the frame 97. FIG. 14 illustrates one form of joining the edges of the floors and also provides a cross-sectional view of one embodiment of a floor structure. In this form as shown in FIG. 14, the floors include a stainless steel plate on upper and lower surfaces indicated at 100 with the space between the plates filled with an epoxy modified concrete. The concrete filler includes reinforcing bars also preferably of stainless steel indicated at 102. The edges of the pie shaped segments can be joined together using an overlapping joint as is illustrated in FIG. 14 with the epoxy modified internal portions of the deck being connected together by pliable waterproof epoxy indicated at 104. Thereafter, the steel splice plates 105 can be welded in place along the overlapping joint to provide the additional support needed for the decks.

Figure 16A:
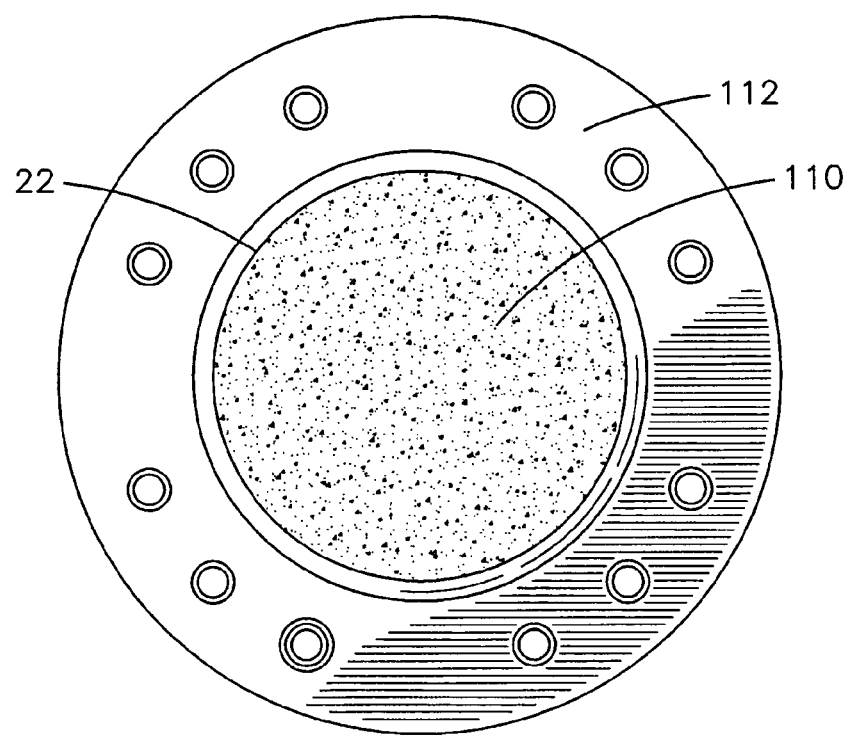
FIGS. 16A and 16B illustrate detailed views of the center column supporting the structure of FIG. 1.
Figure 16B:
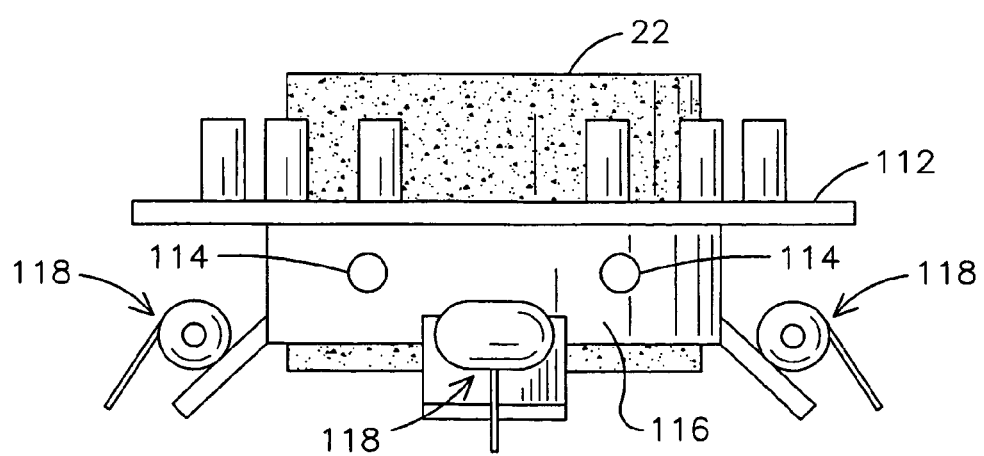
Figure 17:
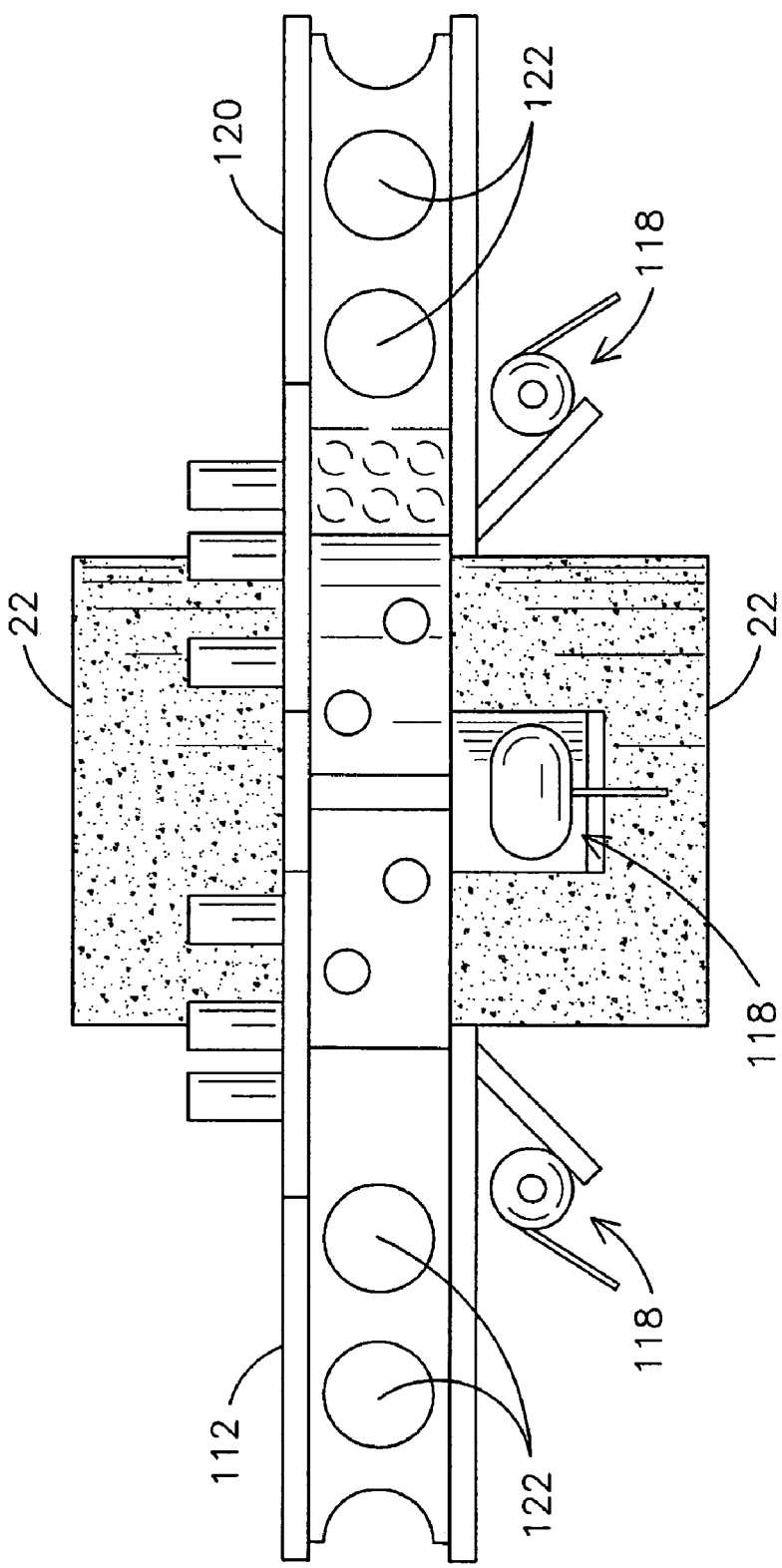
FIG. 17 is an expanded view of the center column of FIG. 16A.
Figure 18:
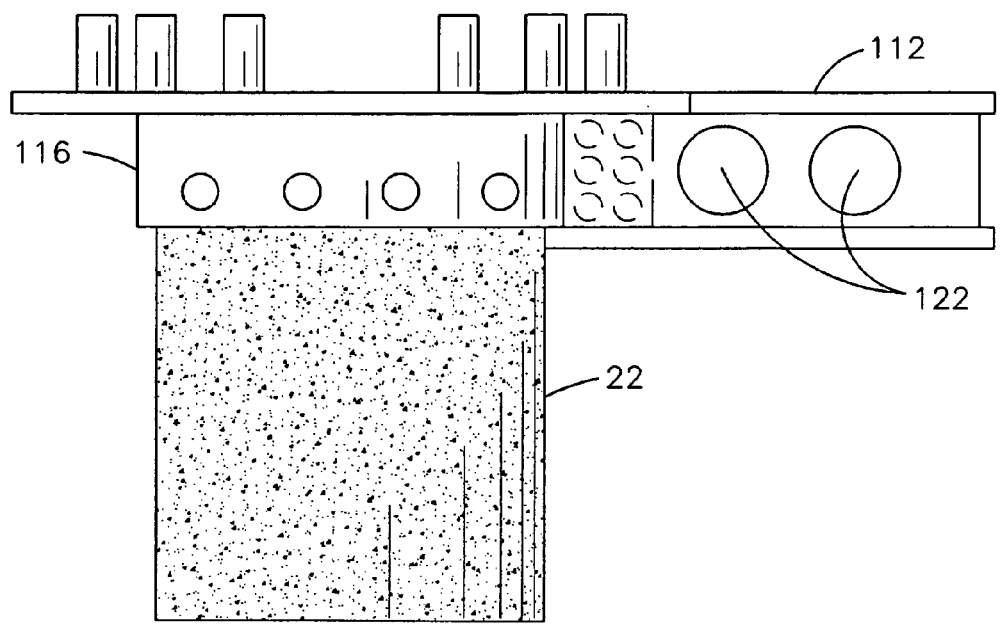
FIG. 18 illustrates one form of attachment of columns to cross-sections for the structure of FIG. 1.

Turning now to FIGS. 16A and 16B, there is shown a more detailed view of the center column 22. In FIG. 16A, it can be seen that the center column 22 has a reinforced concrete center 110 to which is attached a circular stainless steel flange plate at each of the decks to provide connection between the column and the decks. Each of the columns 22 are constructed in the same fashion with the flanges on 12 attached to the columns by means of stainless steel pins 114 positioned in corresponding holes in a collar 116 forming part of the flange 112. For the lower deck 26, there is provided a tensioning spool and cable indicated generally at 118. As can be seen, in the particular embodiment, the collar 116 is tensioned using the tensioning spools and cables which are attached from the collar 116 to each of the outer posts 22. FIG. 17 illustrates a somewhat larger view of the center column 22 showing the connection of the cross beams for support of the various decks. The cross beams 120 are preferably ten inch I-beams including weight reduction holes 122. The I-beams are attached to the collar and flange 116, 112 to form the basic support for each of the decks. FIG. 18 is a slightly different view of the structure of FIG. 17 showing the column anchor holes for attaching collar 116 of flange 112 to the outer columns 22.

Figure 19:
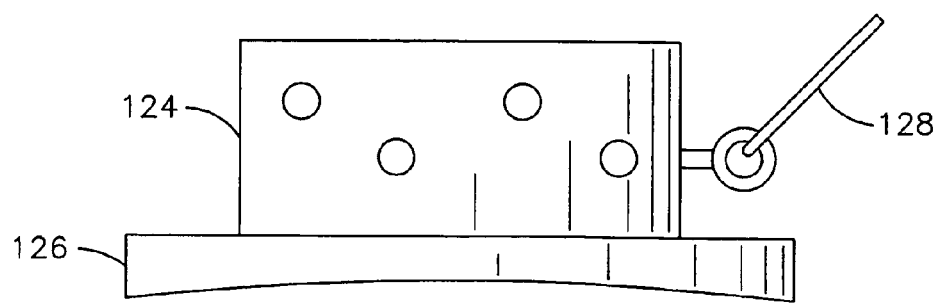
FIG. 19 illustrates another form of attachment of a column support base to the ballast system of FIG. 5.

FIG. 19 illustrates one form of attachment of the column support base 124 to the ballast system 18. In essence, the attachment utilizes a structure similar to the flange and collar arrangements for attaching the decks to the column but in an inverted configuration. At the base, the collar faces upward while the flange 126 faces downward so that the flange can be attached to each of the buoyancy tanks 60 by either welding or bolting. Tensioning cables 128 are then used to create tension between the outer base of the columns 22 and the center column 22. The tensioning maintains the alignment between the base of the column and the center of the structure.

Figure 20:
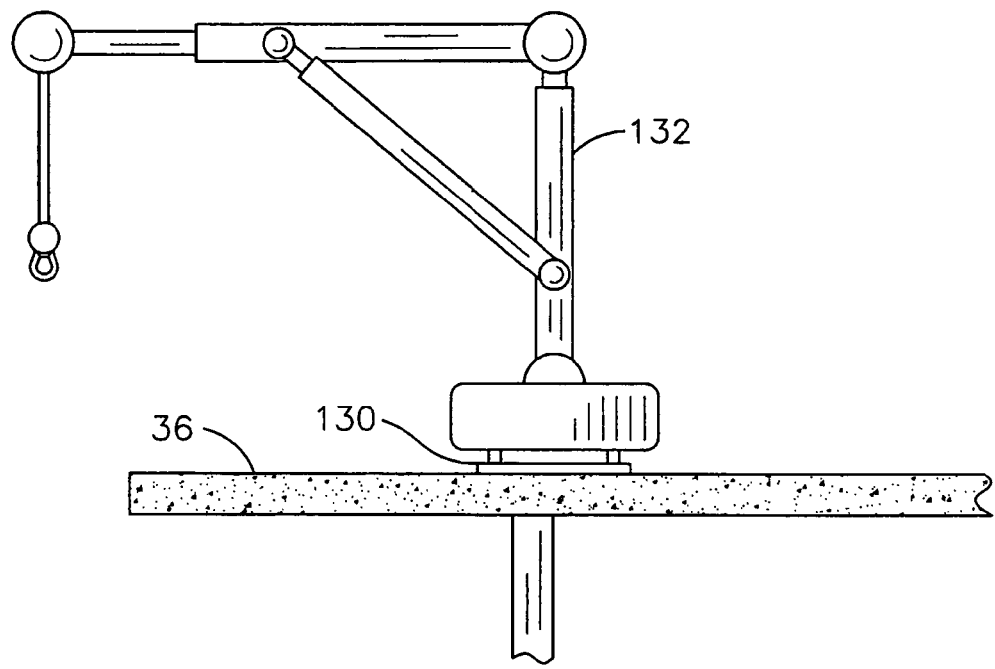
FIG. 20 shows one illustration of a maritime crane added to the top deck of the structure of FIG. 1.

FIG. 20 shows one additional feature that may be added to the top deck 36 of the structure. In this embodiment, the deck is provided with a track indicated at 130 on which rides a conventional maritime crane or davit 132. The use of this structure allows for objects to be loaded from the water level at deck 26 and brought up to the top deck 36.

Figure 21:
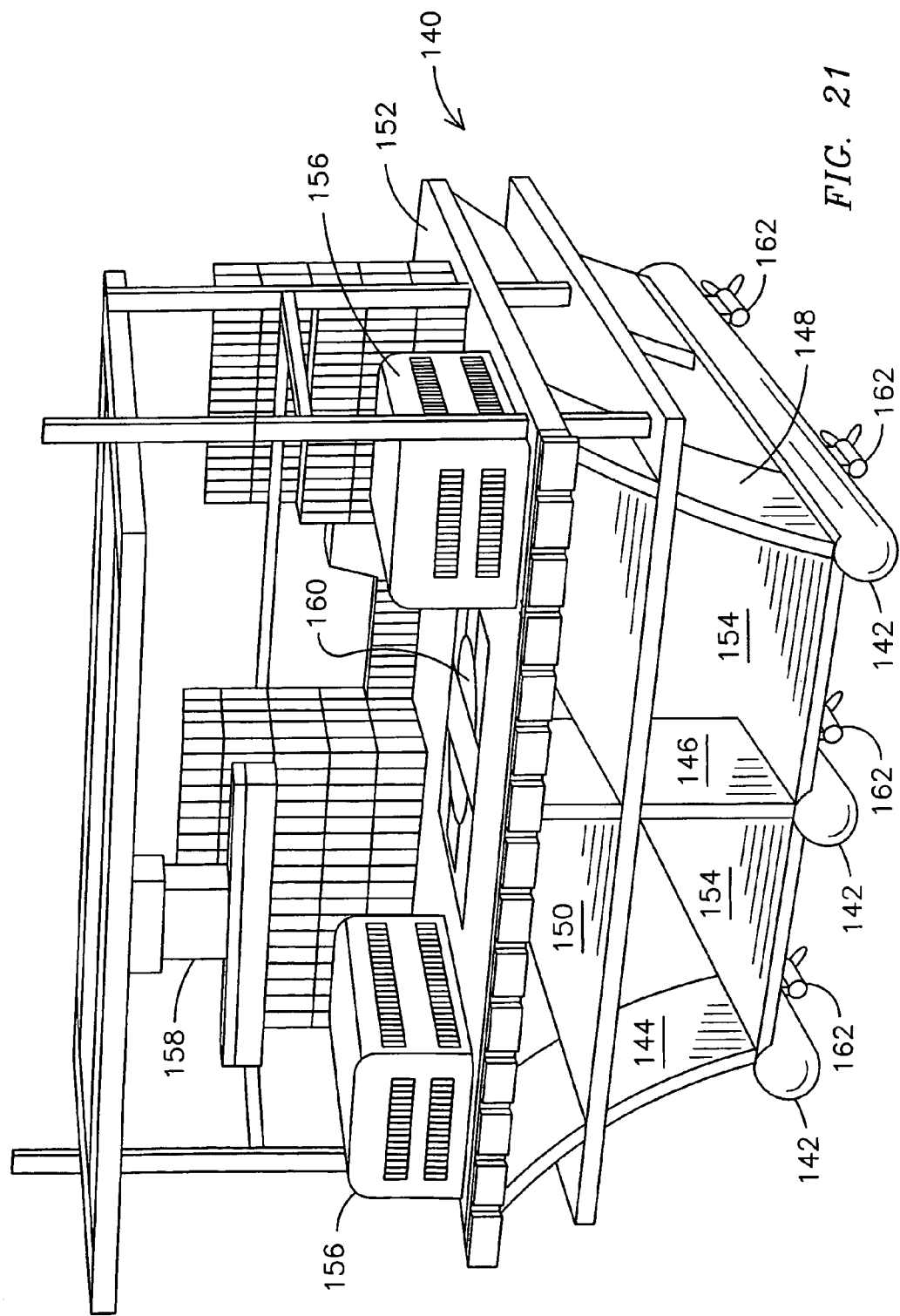
FIG. 21 illustrates a mobile embodiment of the structure of FIG. 1.

Many of the functions described above as being performed by a stationary structure located adjacent a shipping channel could also be performed by a mobile structure. Referring now to FIG. 21, there is shown one proposed design for a mobile structure that could be used to achieve the desired results of vessel inspection and analysis for detecting undesirable cargo. The structure of FIG. 21 is designed as a tri-hull vessel which could be in the area of 220 feet in length by 100 feet wide and 65 feet high. Vessel 140 of FIG. 21 utilizes three pontoons 142 which support three separate vertical walls 144, 146 and 148 which lead to a pair of upper decks 150, 152. The pontoons 142 are connected by a sea level deck 154. The deck 154 has the capability to be awash and provides easy access for boarding of the vessel 140.

The intermediate deck 150 may be a container operations deck and support container transport rails with appropriately positioned turn tables and isolation cart transport systems for container movement on board. The containers, indicated at 154 on the upper deck 152, move through an on board linear accelerator with back scatter capabilities so that they can be x-rayed in all dimensions.

The upper deck 152 operates as a main deck to support control towers and a retractable container cargo crane system. The control towers are indicated at 156 and the crane system is indicated at 158. The control towers 156 may be mirrored so as to allow control of the vessel from either a port or starboard location. In addition, there may be provided a helicopter flight deck between the control towers at 160.

The port and starboard pontoons 142 are each provided with a pair of propulsion motors 162 to enable movement of the vessel. The engine pods 162 may each be on swivels to allow the vessel to easily maneuvered in order to approach a suspect vessel in a shipping channel. The vessel 140 is capable of removing suspect containers from a container ship at a location removed from a marine port in order to assure safety measures for the port. In one form, the vessel 140 includes grapplers that are pneumatically operated to attach the vessel 140 to any container ship.

Figure 22:
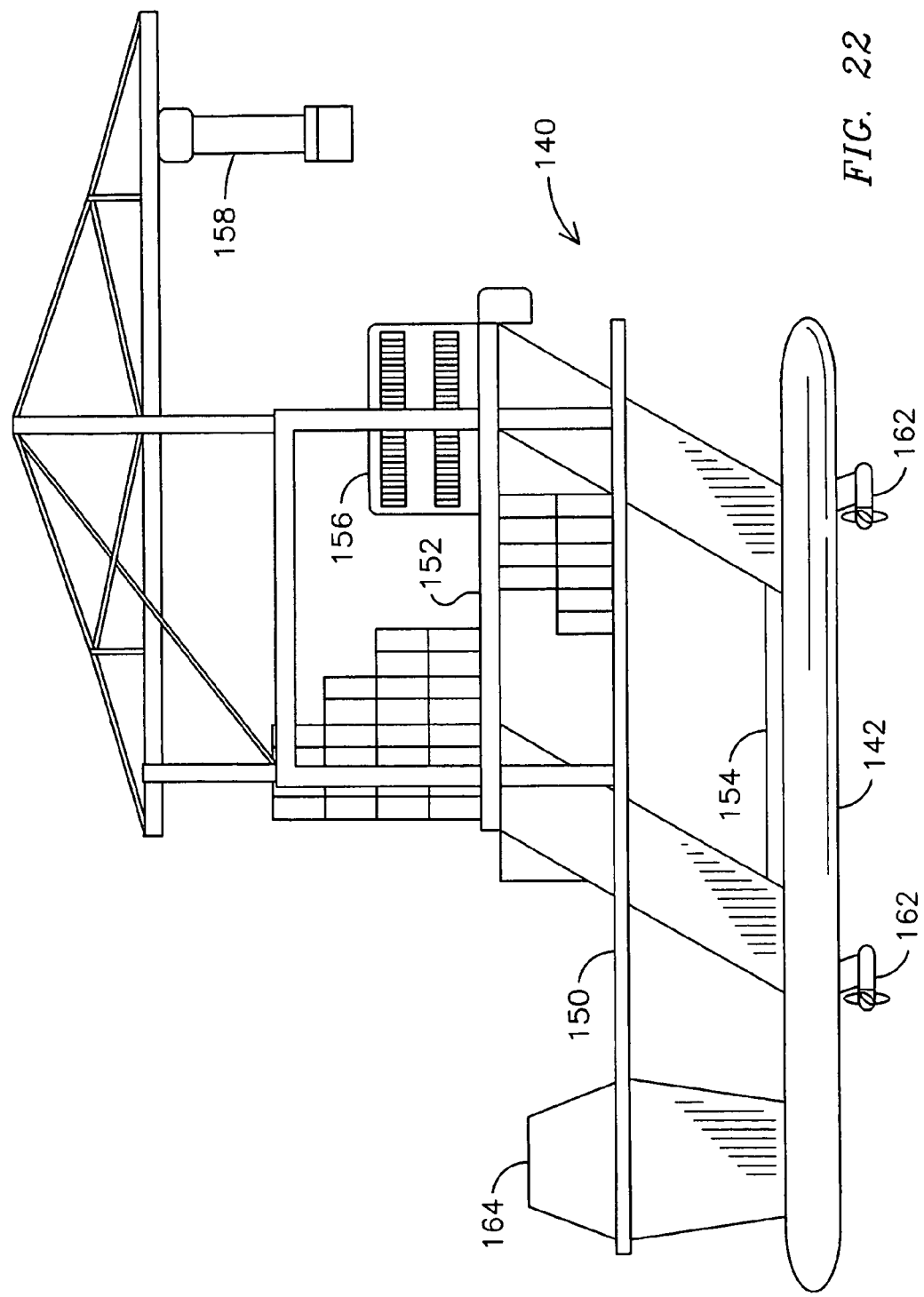
FIG. 22 is a side view of the structure of FIG. 21.

FIG. 22 is a side elevation view of the vessel 140 of FIG. 21. The various features described with regard to FIG. 21 are shown in profile in FIG. 22. The blast containment dome 164 at the rear of the vessel 140 is clearly visible in FIG. 22. The dome 164 is designed to be sufficiently large to accommodate a conventional cargo container so that a suspect container can be placed within the dome to contain any blast that might be generated by conventional explosives.

Figure 24:
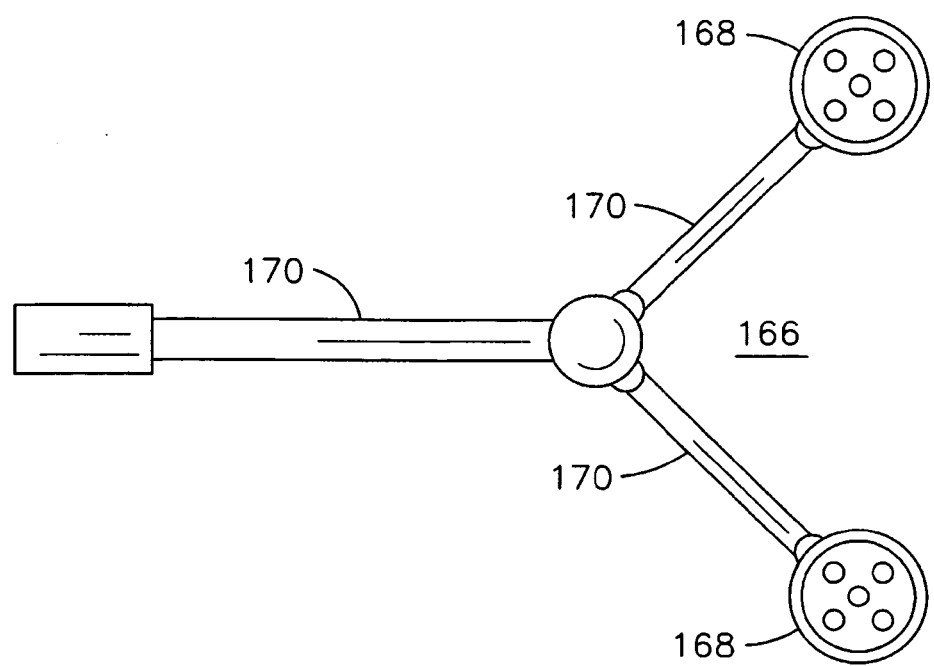
FIG. 24 illustrates the innovative grapplers utilized to connect the structure of FIG. 21 to a container vessel.
Figure 23:
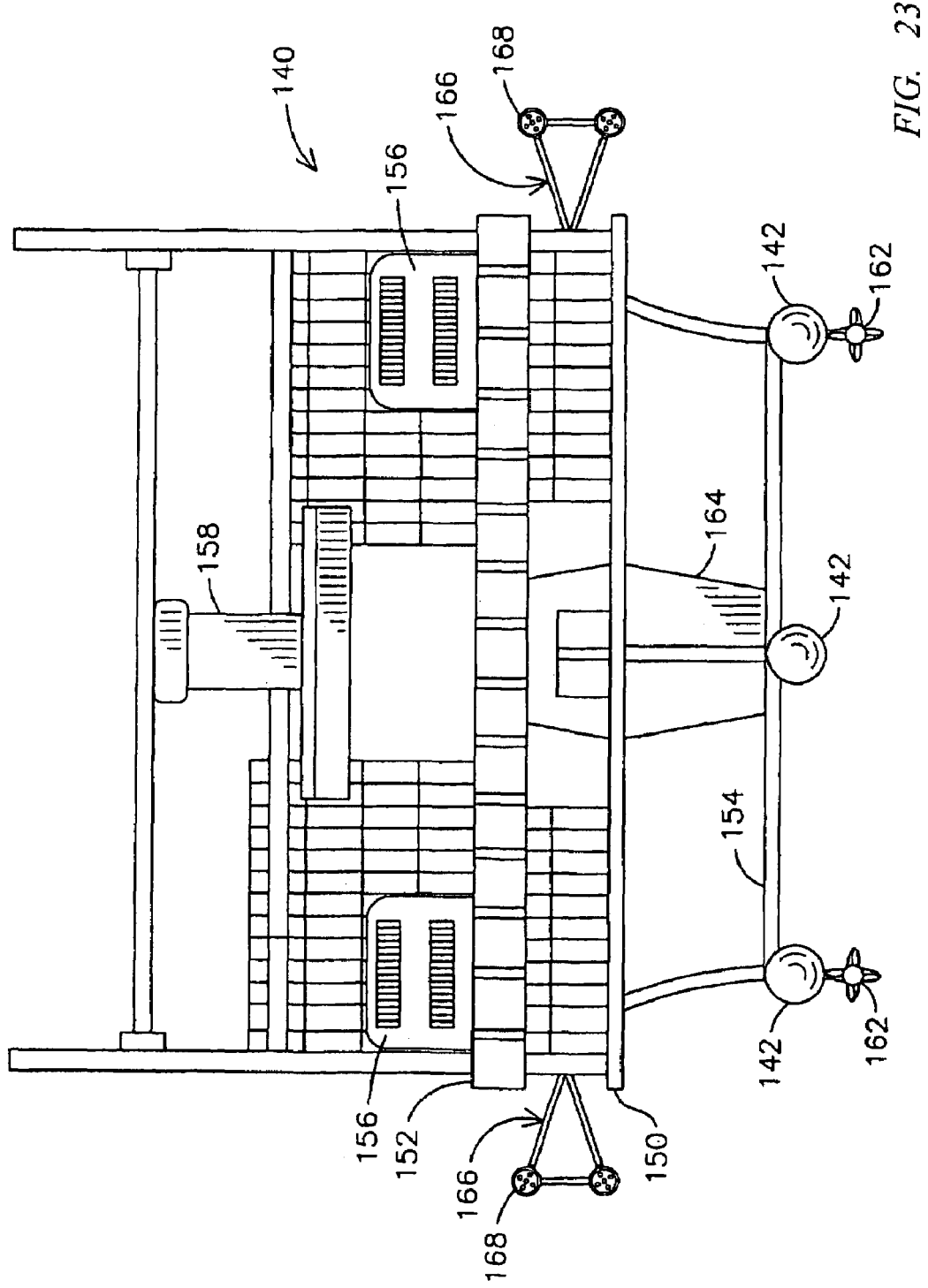
FIG. 23 is an end view of the structure of FIG. 21.

Referring now to FIG. 23, there is shown a rear elevation view of vessel 140. Of significance in FIG. 23 are the grapplers 166 located on each side of the vessel. Each of these grapplers are designed to be pneumatically actuated so as to be capable of attaching to a container ship. FIG. 24 illustrates one design of the grapplers 166. As shown, each of the grapplers terminates in a pair of large cup-shaped fittings having openings for pneumatic or vacuum attachment of the cup-shape fittings 168 to a container vessel. The vacuum is created at the suction ends 168 by an on board pneumatic pump drawing air through each of the tubular conduits 170.

In the event that an explosive is identified in any of the cargo containers, the container can be moved into the blast containment dome 164. Referring to FIG. 22, one design of the vessel 140 is to provide a vessel separation section 172 which separates at about the line 174 from the main vessel so that the blast containment dome can be pushed aft of the main vessel and thereby protect the main vessel from damage if the containment dome 164 fails. In one form, it is anticipated that the containment dome could be moved up to 125 feet from the primary vessel and thereby protect the primary vessel 140 from damage upon failure of the dome 164. Alternately, the containment dome 164 can be arranged to not only be pushed aft of the vessel 140 but also be provided with means for submerging or sinking the separated section to further restrain explosive damage. Sinking may be achieved by using valves and/or shaped charges to admit water into the containment dome and the separation section.

It will be recognized that all of the features described previously for use on the fixed structure of FIG. 1 can be incorporated into the movable structure of FIG. 21. Further, while it is contemplated that either the structure of FIG. 1 or the structure of FIG. 21 would actually comprise manned structures, it is possible to provide remote control of either structure and thereby eliminate the risk to personnel on the structures in the event that an explosive is placed in a cargo container.

While the invention has been described in what is presently considered to be a preferred embodiment, various modifications and improvements will become apparent to those of ordinary skill in the art. It is therefore intended that the invention not be limited to this specific disclosed embodiment but be interpreted within the scope of the underlying concept.

What is claimed is:

1. A marine port inspection system comprising:
    at least one structure positioned in a waterway adjacent an entrance to a marine port, the structure including a positioning system for maintaining a desired position of the structure;
    a plurality of underwater sensors placed across a shipping channel into the marine port, each of the sensors providing data indicative of externally mounted devices on hulls of vessels passing in the channel;
    monitoring apparatus on said structure for receiving data from said sensors and for converting said data into a form for presentation to an operator;
    inspection equipment mounted on said structure and adapted for non-intrusive inspection of cargo containers; and
    lifting apparatus on said structure for removing cargo containers from vessels in the channel and positioning the containers for inspection by said inspection equipment.

2. The system of claim 1 and including a pontoon ballast system attached to said structure for controlling a floating height of said structure in the waterway.

3. The system of claim 2 and including a current damping system coupled to said ballast system for compensating for ocean currents and swells.

4. The system of claim 3 wherein said structure is a multi-level structure.

5. The system of claim 4 and including a second structure positioned on an opposite side of the shipping channel from said at least one structure.

* * * * *